US012583505B2

(12) United States Patent
Watanabe et al.

(10) Patent No.: US 12,583,505 B2
(45) Date of Patent: Mar. 24, 2026

(54) RACK GUIDE

(71) Applicant: OILES CORPORATION, Fujisawa (JP)

(72) Inventors: Tomoki Watanabe, Fujisawa (JP); Ryouji Yoshikawa, Fujisawa (JP)

(73) Assignee: Oiles Corporation, Fujisawa (JP)

( * ) Notice: Subject to any disclaimer, the term of this patent is extended or adjusted under 35 U.S.C. 154(b) by 0 days.

(21) Appl. No.: 18/872,749

(22) PCT Filed: Jun. 15, 2023

(86) PCT No.: PCT/JP2023/022306
§ 371 (c)(1),
(2) Date: Dec. 6, 2024

(87) PCT Pub. No.: WO2024/004691
PCT Pub. Date: Jan. 4, 2024

(65) Prior Publication Data
US 2025/0346285 A1      Nov. 13, 2025

(30) Foreign Application Priority Data

Jun. 27, 2022    (JP) ................................. 2022-102336

(51) Int. Cl.
*B62D 3/12* (2006.01)
*F16H 19/04* (2006.01)
(Continued)

(52) U.S. Cl.
CPC ............. *B62D 3/123* (2013.01); *F16H 19/04* (2013.01); *F16H 55/283* (2013.01);
(Continued)

(58) Field of Classification Search
CPC .. B62D 3/123; F16H 55/283; F16H 2055/281
See application file for complete search history.

(56) References Cited

U.S. PATENT DOCUMENTS

| | | | | | |
|---|---|---|---|---|---|
| 7,926,376 | B2 * | 4/2011 | Hirose | ................... | B62D 3/123 |
| | | | | | 384/42 |
| 11,691,661 | B2 * | 7/2023 | Krishnan | .............. | F16H 55/283 |
| | | | | | 74/409 |
| 2019/0135329 | A1 * | 5/2019 | Feldpausch | ............ | B62D 3/123 |

FOREIGN PATENT DOCUMENTS

| | | | |
|---|---|---|---|
| FR | 2851540 A1 | 8/2004 | |
| JP | JP 50-083938 A | 7/1975 | |

(Continued)

OTHER PUBLICATIONS

International Search Report and Written Opinion issued in International Application No. PCT/JP2023/022306, mailed on Sep. 5, 2023.

(Continued)

*Primary Examiner* — Jake Cook
(74) *Attorney, Agent, or Firm* — Knobbe, Martens & Olson & Bear, LLP

(57) ABSTRACT

Proposed is a rack guide which achieves a stable feed of a lubricant from a rack bar to a lubricant retaining groove when the rack bar slides against the rack guide. A lubricant retaining groove is arranged in the supporting surface, the lubricant retaining groove being configured to extend in a rack guide transverse direction perpendicular to a rack guide longitudinal direction and retain a lubricant located between a rack bar and a supporting surface. The lubricant retaining groove has a ship-bow-shaped lubricant introducing area into which the lubricant is introduced and a lubricant retaining area connected to the lubricant introducing area and configured to retain the lubricant introduced from the lubricant introducing area. The lubricant retaining area of the lubricant retaining groove is provided in a contact area of the supporting surface.

7 Claims, 5 Drawing Sheets

(51) Int. Cl.
    F16H 55/28       (2006.01)
    F16H 57/04       (2010.01)

(52) U.S. Cl.
    CPC ..... *F16H 57/048* (2013.01); *F16H 2019/046*
               (2013.01); *F16H 2055/281* (2013.01)

(56)              References Cited

FOREIGN PATENT DOCUMENTS

| JP | 2002-370654 A | 12/2002 |
|----|---------------|---------|
| JP | 2003-312502 A | 11/2003 |
| JP | 2006-116994 A | 5/2006 |
| JP | 2007-245828 A | 9/2007 |
| JP | 2017-024620 A | 2/2017 |
| JP | 2019-039496 A | 3/2019 |
| JP | 2021-079886 A | 5/2021 |
| JP | 3232479 U | 6/2021 |
| KR | 10-2022-0080921 A | 6/2022 |

OTHER PUBLICATIONS

Microfilm of the specification and drawings annexed to the request
of Japanese Utility Model Application No. 003358/1989 (Laid-open
No. 09628/1990) (Oiles Industry Co Ltd) Jul. 31, 1990.
CD-ROM of the specification and drawings annexed to the request
of Japanese Utility Model Application No. 071908/1991 (Laid-open
No. 035543/1993) (Atsugi Unisia Corp.) May 14, 1993.

* cited by examiner

⇨ LUBRICANT FLOW ON RACK BAR SIDE

⇨ LUBRICANT FLOW ON SEAT SIDE

➡ LUBRICANT FLOW ON FACING SURFACE

⇨ LUBRICANT FLOW ON RACK BAR SIDE

⇨ LUBRICANT FLOW ON SEAT SIDE

➡ LUBRICANT FLOW ON FACING SURFACE

RACK GUIDE

The present application is a U.S. national phase application under 35 U.S.C. § 371 of International Application No. PCT/JP2023/022306, filed on Jun. 15, 2023, which claims the benefit of Japanese Patent Application No. 2022-102336 filed on Jun. 27, 2022 in the Japan Patent Office, the entire disclosure of each of which is incorporated herein by reference.

TECHNICAL FIELD

The present invention relates to a rack guide for a steering device for changing a steering angle of a tire, and particularly to a rack guide for guiding a rack bar in a bar longitudinal direction.

BACKGROUND ART

Conventionally, as a rack guide for guiding a rack bar in a longitudinal direction, there is known a rack guide comprising a multilayer sliding piece having: a pair of inclined surface portions facing each other; a pair of flat surface portions continuous with these corresponding inclined surface portions; a bottom surface portion continuous with each of the flat surface portions; and a hollow protrusion portion extending at the center of this bottom surface portion toward a backing metal side, the multilayer sliding piece being configured to support the rack bar (for example, see Patent Literature 1).

PRIOR ART DOCUMENT

Patent Literature

Patent Literature 1: JP2006-116994A (particularly, see FIG. 2. )

SUMMARY OF INVENTION

Technical Problem

Recessed portions in the inclined surface portions of the multilayer sliding piece of the rack guide as described above are filled with a lubricant, and when the rack bar moves in the rack bar longitudinal direction, the lubricant filling the recessed portions is supplied to the rack bar, whereas. it is possible that the lubricant is insufficiently fed to the recessed portions so that the lubricant is drained from the recessed portions.

Thus, the present invention is to solve the problem of conventional technologies as described above and it is an object of the present invention to provide a rack guide which achieves a stable feed of a lubricant from a rack bar to a lubricant retaining groove when the rack bar slides against the rack guide.

Solution to Problem

The invention according to claim 1 is to solve the above problem by a rack guide for a steering device, comprising a supporting surface for supporting a sliding surface provided behind a meshing surface formed on a rack bar having a D-shaped cross section, the rack bar being configured to mesh with a pinion formed on a steering shaft to convert a rotational motion of the steering shaft into a linear motion, the rack guide being configured to guide the rack bar in a bar longitudinal direction of the rack bar to change a steering angle of a tire, in which the sliding surface of the rack bar is a curved surface formed to have a single radius of curvature, the supporting surface is a curved surface having a contact area configured to come into slidable contact with the rack bar and a spaced facing area configured to face the rack bar with a space therebetween and has a sliding direction of the rack bar, the contact area is located between the spaced facing area on an inner side closer to a rack guide longitudinal center axis configured to extend in a rack guide longitudinal direction parallel to a sliding direction of the rack bar and the spaced facing area on an outer side farther from the rack guide longitudinal center axis, a lubricant retaining groove is arranged in the supporting surface, the lubricant retaining groove being configured to extend in a rack guide transverse direction perpendicular to the rack guide longitudinal direction and retain a lubricant located between the rack bar and the supporting surface, the lubricant retaining groove has a ship-bow-shaped lubricant introducing area into which the lubricant is introduced and a lubricant retaining area connected to the lubricant introducing area and configured to retain the lubricant introduced from the lubricant introducing area, the lubricant retaining area of the lubricant retaining groove is provided in the contact area of the supporting surface, and the lubricant introducing area of the lubricant retaining groove is provided in the spaced facing area on the outer side in the supporting surface and formed to be symmetrical with respect to a groove longitudinal center axis parallel to the rack guide transverse direction.

The invention according to claim 2 is to further solve the above problem by, in addition to the configuration of the invention according to claim 1, a feature in which the lubricant retaining area is perpendicular to the contact area of the supporting surface, the contact area extending in the rack guide longitudinal direction.

The invention according to claim 3 is to further solve the above problem by, in addition to the configuration of the invention according to claim 1 or claim 2, a feature in which the lubricant retaining area extends to the spaced facing area on the inner side in the supporting surface.

The invention according to claim 4 is to further solve the above problem by, in addition to the configuration of the invention according to claim 1 or claim 2, a feature in which a facing surface configured to face the sliding surface of the rack bar is arranged more outward than the supporting surface and at a position farther away from the rack bar than the supporting surface.

Effects of Invention

According to the rack guide of the invention according to claim 1, a lubricant retaining groove is arranged in the supporting surface, the lubricant retaining groove being configured to extend in a rack guide transverse direction perpendicular to the rack guide longitudinal direction and retain a lubricant located between the rack bar and the supporting surface, the lubricant retaining groove has a ship-bow-shaped lubricant introducing area into which the lubricant is introduced and a lubricant retaining area connected to the lubricant introducing area and configured to retain the lubricant introduced from the lubricant introducing area, the lubricant retaining area of the lubricant retaining groove is provided in the contact area of the supporting surface, and the lubricant introducing area of the lubricant retaining groove is provided in the spaced facing area on the outer side in the supporting surface, whereby, while the rack bar slides in the bar longitudinal direction, even when the lubricant retained in the lubricant retaining area of the lubricant retaining groove is dragged by the lubricant adhering to the rack bar so as to flow out from the lubricant retaining groove to the exterior of the lubricant retaining groove, in accordance with such outflow of the lubricant from the lubricant retaining area of the lubricant retaining groove, the lubricant located in the lubricant introducing area is fed to the lubricant retaining area, so that into the lubricant introducing area with the lubricant thus decreased, the lubricant flows in accordance with sliding of the rack bar, which can achieve a stable feed of the lubricant to the lubricant retaining groove by means of the rack bar.

Further, the lubricant introducing area of the lubricant retaining groove is formed to be symmetrical with respect to a groove longitudinal center axis parallel to the rack guide transverse direction, so that an inflow amount of the lubricant into the lubricant introducing area does not depend upon a rack bar sliding direction perpendicular to the rack guide transverse direction, and accordingly, a total amount of the lubricant in the supporting surface does not depend upon the number or the position of the lubricant retaining grooves, which can increase degrees of freedom of arrangement of the lubricant retaining grooves in the supporting surface.

According to the rack guide of the invention according to claim 2, in addition to the effects produced by the rack guide of the invention according to claim 1, the lubricant retaining area is perpendicular to the contact area of the supporting surface, the contact area extending in the rack guide longitudinal direction, which makes it easier for the lubricant retained in the lubricant retaining area to adhere to the rack bar rather than flowing in the rack guide transverse direction when the rack bar slides in the longitudinal direction, so that when the rack bar slides against the rack guide, the lubricant is stably supplied from the lubricant retaining groove to the rack bar, which can achieve both a stable feed of the lubricant from the rack bar to the lubricant retaining groove and a stable supply of the lubricant from the lubricant retaining groove to the rack bar.

According to the rack guide of the invention according to claim 3, in addition to the effects produced by the rack guide of the invention according to claim 1 or claim 2, the lubricant retaining area extends to the spaced facing area on the inner side in the supporting surface, whereby the lubricant introduced from the lubricant introducing area into the lubricant retaining groove spreads to the spaced facing area on the inner side in the supporting surface, and then the lubricant spreading to the spaced facing area on the inner side in the supporting surface is circulated by sliding of the rack bar to the spaced facing area on the outer side in the supporting surface, so that in comparison with a case in which the lubricant retaining area does not extend to the spaced facing area on the inner side in the supporting surface, an larger amount of the lubricant contributing to sliding of the rack bar can be retained and thus the lifetime of the rack guide can be extended.

According to the rack guide of the invention according to claim 4 of the present invention, in addition to the effects produced by the rack guide of the invention according to claim 1 or claim 2, a facing surface configured to face the sliding surface of the rack bar is arranged more outward than the supporting surface and at a position farther away from the rack bar than the supporting surface, whereby, even when the rack bar slides against the rack guide and the lubricant interposed between the rack bar and the supporting surface overflows from between the rack bar and the supporting surface, then the lubricant accumulates between the sliding surface of the rack bar and the facing surface, so that the lubricant can be not only easily stored on the rack guide, but also the lubricant accumulating between the sliding surface of the rack bar and the facing surface adheres to the rack bar so as to be fed to the lubricant retaining groove, which can circulate the lubricant between the entirety of the supporting surface of the rack guide and the rack bar.

DESCRIPTION OF EMBODIMENTS

Figure 1:
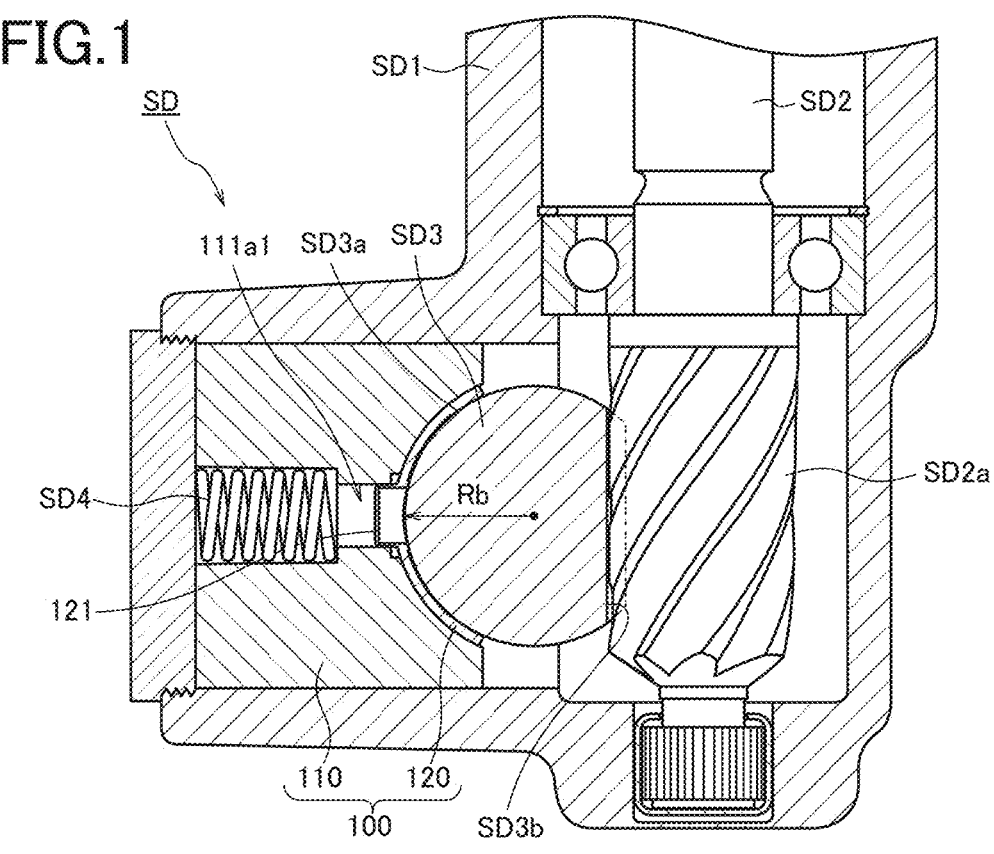
FIG. 1 is a cross-sectional view of a rack and pinion steering device in which a rack guide according to an embodiment of the present invention is installed.

Any specific embodiment of the present invention may be suitable as long as a rack guide for a steering device comprises a supporting surface for supporting a sliding surface provided behind a meshing surface formed on a rack bar having a D-shaped cross section, the rack bar being configured to mesh with a pinion formed on a steering shaft to convert a rotational motion of the steering shaft into a linear motion, the rack guide being configured to guide the rack bar in a bar longitudinal direction of the rack bar to change a steering angle of a tire, in which the sliding surface of the rack bar is a curved surface formed to have a single radius of curvature, the supporting surface is a curved surface having a contact area configured to come into slidable contact with the rack bar and a spaced facing area configured to face the rack bar with a space therebetween and has a sliding direction of the rack bar, the contact area is located between the spaced facing area on an inner side closer to a rack guide longitudinal center axis configured to extend in a rack guide longitudinal direction parallel to a sliding direction of the rack bar and the spaced facing area on an outer side farther from the rack guide longitudinal center axis, a lubricant retaining groove is arranged in the supporting surface, the lubricant retaining groove being configured to extend in a rack guide transverse direction perpendicular to the rack guide longitudinal direction and retain a lubricant located between the rack bar and the supporting surface, the lubricant retaining groove has a ship-bow-shaped lubricant introducing area into which the lubricant is introduced and a lubricant retaining area connected to the lubricant introducing area and configured to retain the lubricant introduced from the lubricant introducing area, the lubricant retaining area of the lubricant retaining groove is provided in the contact area of the supporting surface, and the lubricant introducing area of the lubricant retaining groove is provided in the spaced facing area on the outer side in the supporting surface and formed to be symmetrical with respect to a groove longitudinal center axis parallel to the rack guide transverse direction, in which the rack guide achieves a stable feed of the lubricant from the rack bar to the lubricant retaining groove when the rack bar slides against the rack guide.

For example, the rack guide according to the present invention is configured to be mounted in a rack and pinion steering device of a four-wheeled vehicle, and then the four-wheeled vehicle may be not only a gasoline vehicle or a diesel vehicle but also an electric vehicle or the like.

Embodiment 1

Hereinafter, a rack guide 100 according to an embodiment of the present invention will be explained with reference to FIG. 1 to FIG. 6.

1. Rack Guide Installation Environment

First, an environment in which the rack guide 100 is mounted will be described with reference to FIG. 1 which is a cross-sectional view of a rack and pinion steering device in which a rack guide according to an embodiment of the present invention is installed.

As illustrated in FIG. 1, the rack guide 100 according to the present embodiment is configured to be mounted in a rack and pinion steering device SD of a four-wheeled vehicle.

This rack and pinion steering device SD is configured to change a steering angle of tires (unillustrated) and includes a device housing SD1, a steering shaft SD2 configured to rotate integrally with a steering wheel, a rack bar SD3 configured to mesh with this steering shaft SD2 to convert a rotational motion of the steering shaft SD2 into a linear motion, a rack guide 100 configured to guide this rack bar SD3 in a bar longitudinal direction of the rack bar SD3, and a biasing spring SD4 configured to press this rack guide 100 against the rack bar SD3.

A tip of the steering shaft SD2 is provided with a pinion SD2a configured to mesh with the rack bar SD3 which thus rotates integrally with the steering shaft SD2.

As illustrated in FIG. 1, the rack bar SD3 has a sliding surface SD3a which is a curved surface formed to have a single radius of curvature Rb and a meshing surface SD3b which is provided behind this sliding surface SD3a to serve as rack teeth configured to mesh with the steering shaft SD2, and thus the rack bar SD3 has a D-shaped cross section.

The biasing spring SD4 is interposed between the device housing SD1 and the rack guide 100.

2. Rack Guide Structure

Next, a structure of the rack guide 100 will be described in detail with reference to FIG. 1 to FIG. 4.

Figure 2:
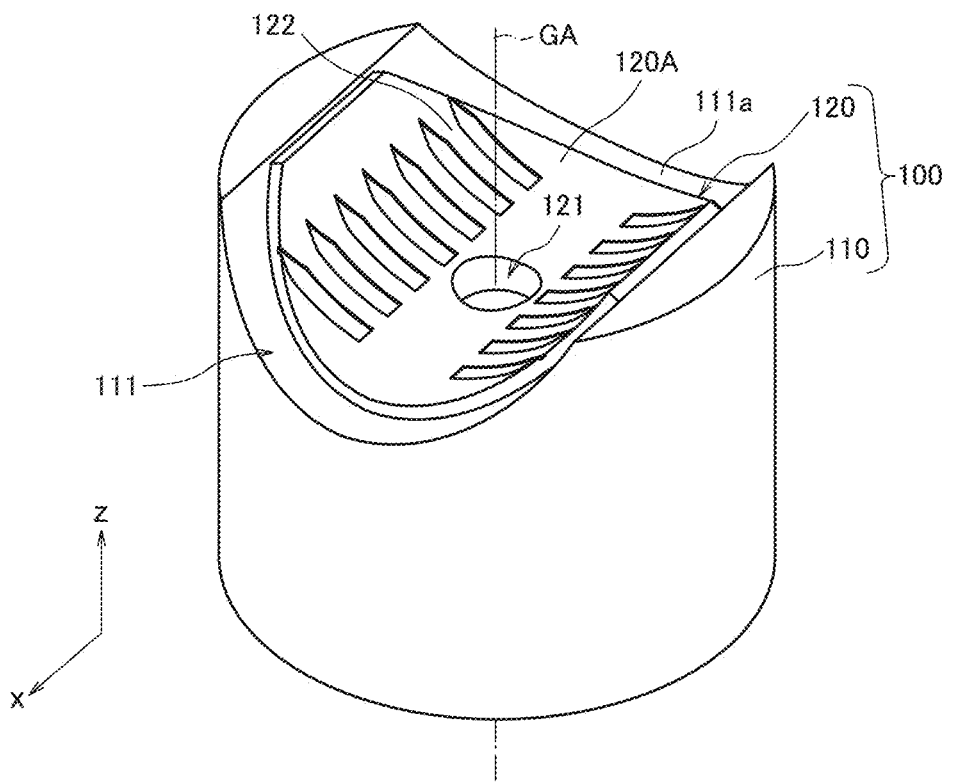
FIG. 2 is a perspective view of the rack guide illustrated in FIG. 1.
Figure 3:
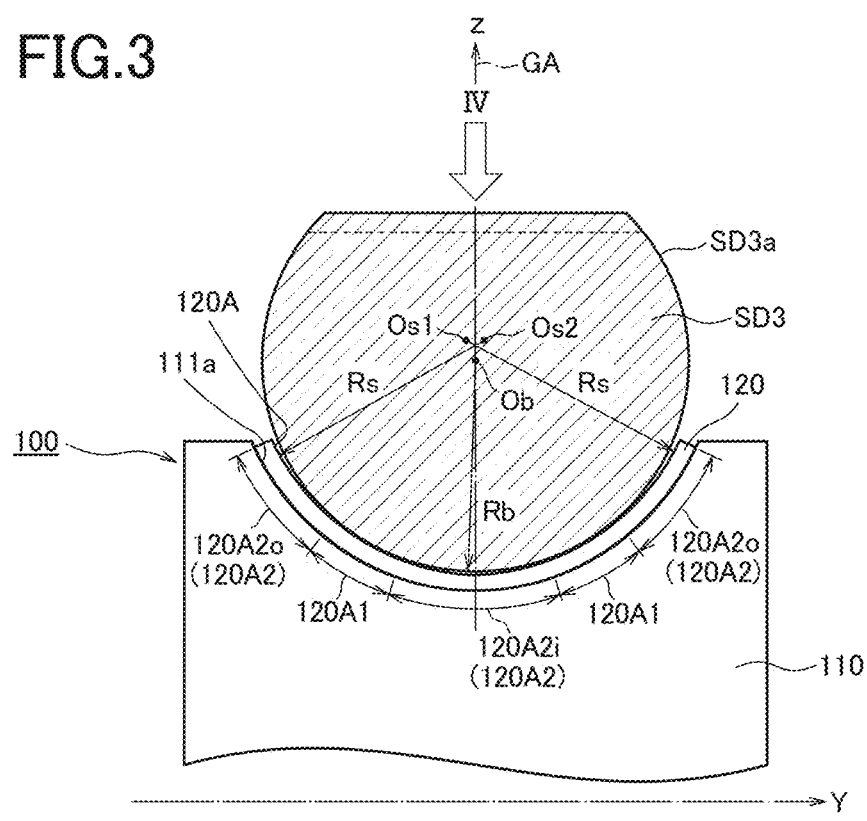
FIG. 3 is a side view illustrating a positional relationship between the rack guide and a rack bar illustrated in FIG. 1.
Figure 4:
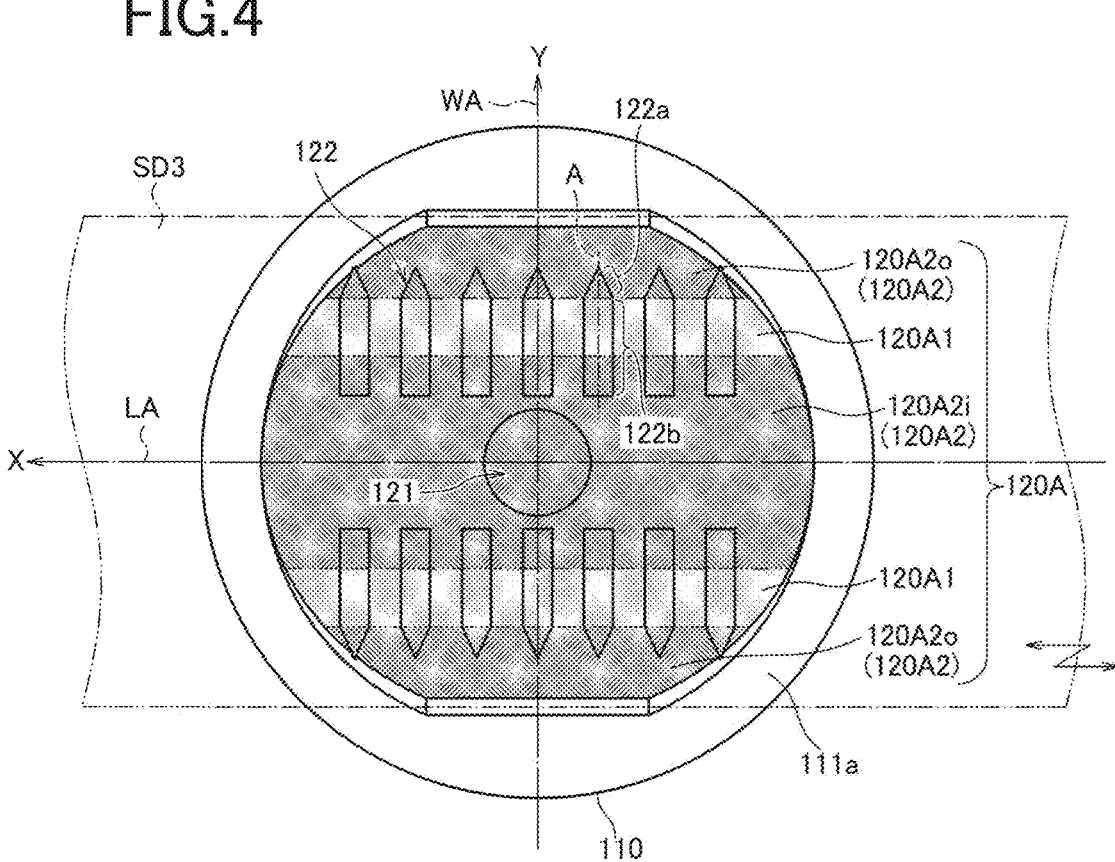
FIG. 4 is a plan view of the rack guide as seen from the IV direction in FIG. 3.

FIG. 2 is a perspective view of the rack guide illustrated in FIG. 1, FIG. 3 is a side view illustrating a positional relationship between the rack guide and a rack bar illustrated in FIG. 1, and FIG. 4 is a plan view of the rack guide as seen from the IV direction in FIG. 3.

As illustrated in FIG. 2, etc., the rack guide 100 is provided with a rack guide body 110 and a seat 120.

<2.1. Rack Guide Body>

As illustrated in FIG. 2, the rack guide body 110 is a cylindrical member made of a metal.

Then, on one end side of this rack guide body 110, there is formed a seat placement groove 111 configured to extend in a seat placement groove longitudinal direction (x direction in FIG. 2) perpendicular to a direction in which a longitudinal center axis of the rack guide body 110 (rack guide center axis GA) extends (z direction in FIG. 2).

As illustrated in FIG. 1 and FIG. 3, a cross-sectional shape of this seat placement groove 111 is semicircular.

Then, as illustrated in FIG. 1, a facing surface 111a of the seat placement groove 111 which faces the sliding surface SD3a of the rack bar SD3 is provided with a seat engagement hole 111a1 configured to engage with a convex portion 121 of the seat 120.

<2.2. Seat>

The seat 120 is a member made of a resin having an excellent self-lubricating property (for example, a fluororesin, such as PTFE, a nylon resin or a polyacetal resin, such as POM) and has a substantially uniform thickness as illustrated in FIG. 3.

Then, as illustrated in FIG. 1 and FIG. 4, the seat 120 has the convex portion 121 formed at the center in a plan view and configured to protrude toward the rack guide body 110.

The seat 120 is integrated with the rack guide body 110 by inserting the convex portion 121 into the seat engagement hole 111a1 of the rack guide body 110 and allowing the same to engage therewith.

Thus, when the seat 120 is assembled to the rack guide body 110, the facing surface 111a of the rack guide body 110 which faces the sliding surface SD3a of the rack bar SD3 is arranged at a position farther away from the rack bar SD3 than a supporting surface 120A of the seat 120 which supports the sliding surface SD3a of the rack bar SD3 as illustrated in FIG. 3.

Further, as illustrated in FIG. 2, etc., the outer shape of the seat 120 is smaller than the outer shape of the facing surface 111a of the rack guide body 110, so that the facing surface 111a of the rack guide body 110 is positioned more outward than the supporting surface 120A of the seat 120.

As illustrated in FIG. 4, the supporting surface 120A of the seat 120 is symmetrical with respect to a seat longitudinal center axis LA configured to pass through the center of the convex portion 121 and extend in a seat longitudinal direction (X direction in FIG. 4) and also with respect to a seat transverse center axis WA configured to pass through the center of the convex portion 121 and extend in a seat transverse direction (Y direction in FIG. 4).

In this case, the seat longitudinal center axis LA and the seat transverse center axis WA are perpendicular to the rack guide center axis GA.

The seat longitudinal direction of the seat 120 is the same direction as the seat placement groove longitudinal direction of the rack guide body 110 and the longitudinal direction (sliding direction) of the rack bar SD3, and the seat longitudinal center axis LA is coaxial with the rack guide longitudinal center axis.

The seat transverse direction of the seat 120 is perpendicular to the seat longitudinal direction of the seat 120, and the seat transverse center axis WA is coaxial with a rack guide transverse center axis.

Further, as illustrated in FIG. 3, when the seat 120 is assembled to the rack guide body 110, the supporting surface 120A has two centers of curvature Os1, Os2.

As illustrated in FIG. 3, these centers of curvature Os1, Os2 are arranged with the rack guide center axis GA therebetween in the Y direction, while being arranged at approximately the same position in the z direction.

Then, a radius of curvature about the center of curvature Os1 and a radius of curvature about the center of curvature Os2 are the same radius of curvature Rs.

In other words, the supporting surface 120A is formed not by a single curved surface, such as the sliding surface SD3*a* of the rack bar SD3, but by two curved surfaces combined together.

Note that on the rack guide center axis GA, a center of curvature Ob of the rack bar SD3 is located.

Accordingly, when the seat 120 is assembled to the rack guide body 110, the supporting surface 120A has a contact area 120A1 configured to come into slidable contact with the rack bar SD3 and a plurality of spaced facing areas 120A2, comprising a first spaced facing area 120A2*i* and a second spaced facing area 120A2*o*, configured to face the rack bar SD3 with a space therebetween as illustrated in FIG. 3 and FIG. 4.

As illustrated in FIG. 3 and FIG. 4, there are the two contact areas 120A1 with the seat longitudinal center axis LA therebetween, each of which is located between the first spaced facing area 120A2*i* on the inner side (the side closer to the seat longitudinal center axis LA) and the second spaced facing area 120A2*o* on the outer side (the side farther from the seat longitudinal center axis LA) in the rack guide transverse direction (Y direction).

<2.2.1. Lubricant Retaining Groove>

As illustrated in FIG. 2, FIG. 4, etc., the supporting surface 120A of the seat 120 is provided with a plurality of lubricant retaining grooves 122 interposed between the sliding surface SD3*a* of the rack bar SD3 and the supporting surface 120A of the seat 120 to retain a lubricant for allowing the rack bar SD3 to smoothly slide against the seat 120.

As illustrated in FIG. 4, these lubricant retaining grooves 122 are arranged in the supporting surface 120A in such a manner as to be symmetrical with respect to the seat longitudinal center axis LA and the seat transverse center axis WA.

Each of the lubricant retaining grooves 122 is a groove having a constant depth and is configured to extend in the seat transverse direction (rack guide transverse direction) as illustrated in FIG. 4.

Then, as illustrated in FIG. 4, these lubricant retaining grooves 122 are formed to be symmetrical with respect to a groove longitudinal center axis A parallel to the rack guide transverse direction.

Further, as illustrated in FIG. 4, the lubricant retaining groove 122 has a ship-bow-shaped lubricant introducing area 122*a* into which the lubricant is introduced and a lubricant retaining area 122*b* connected to this lubricant introducing area 122*a* and configured to retain the lubricant introduced from the lubricant introducing area 122*a*.

As illustrated in FIG. 4, the lubricant introducing area 122*a* is an end portion of the lubricant retaining groove 122 on a side farther from the seat longitudinal center axis LA and has a bow shape.

Then, this lubricant introducing area 122*a* is provided in the spaced facing area 120A2*o* on the outer side in the supporting surface 120A.

As illustrated in FIG. 4, the lubricant retaining area 122*b* is perpendicular to the contact area 120A1 of the supporting surface 120A and extends to the spaced facing area 120A2*i* on the inner side in the supporting surface 120A.

3. Lubricant Flow

Next, a flow of a lubricant G interposed between the rack bar SD3 and the rack guide 100 will be described with reference to FIG. 5A to FIG. 6.

Figures 5A, 5B:
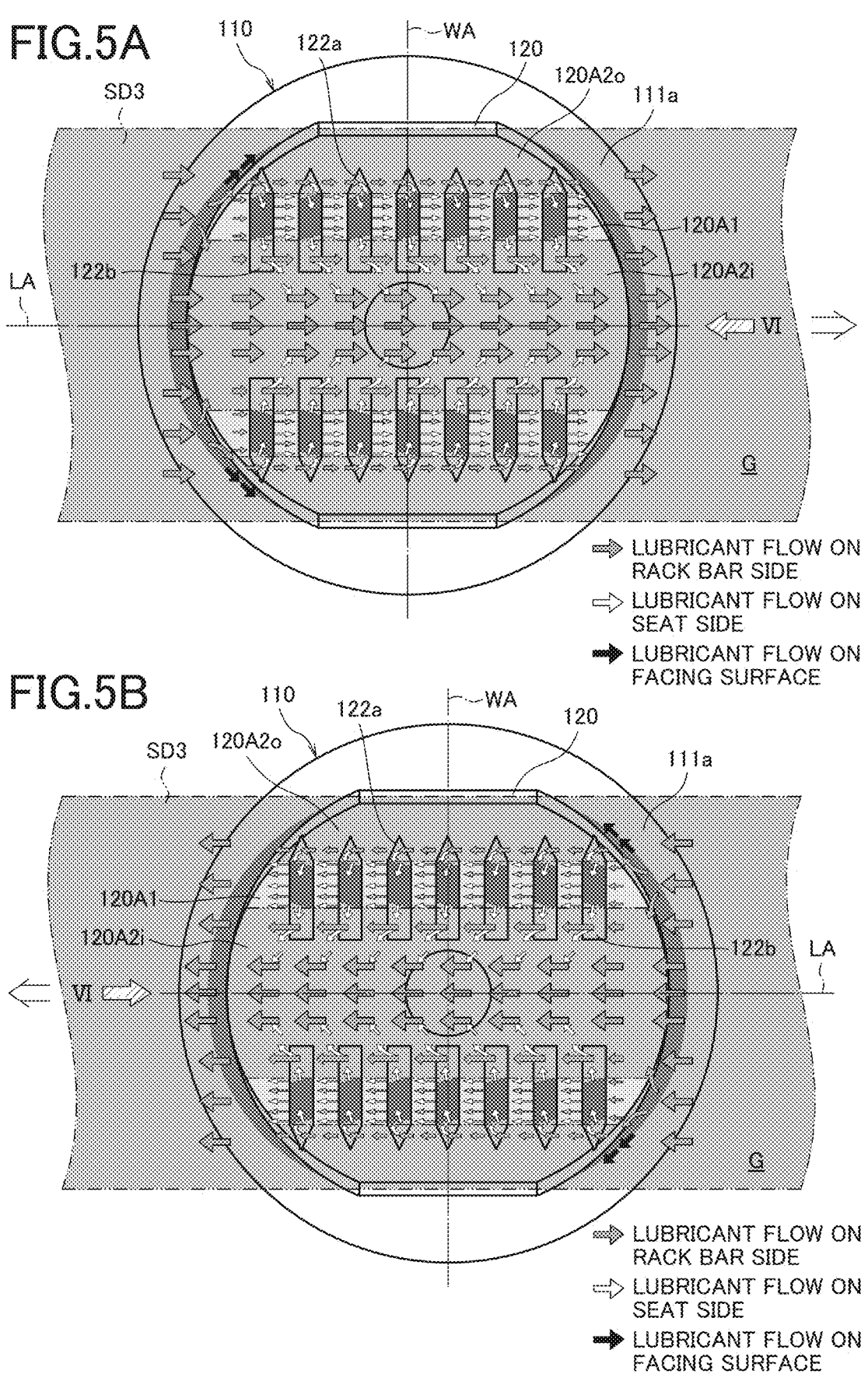
FIG. 5A is a plan view illustrating a flow of the lubricant when the rack bar is moved to the right of the page.
FIG. 5B is a plan view illustrating a flow of the lubricant when the rack bar is moved to the left of the page.
Figure 6:
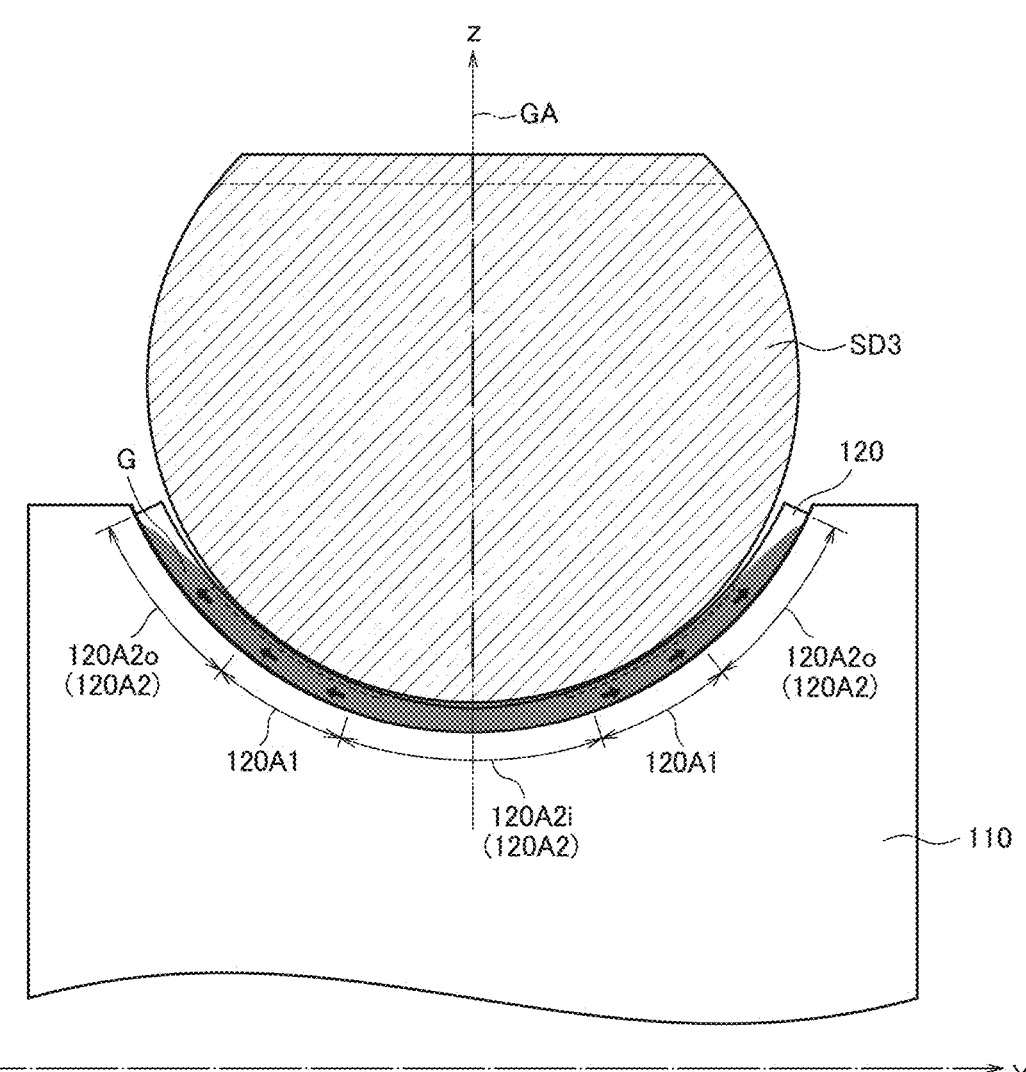
FIG. 6 is a side view of the rack guide as seen from the VI direction in FIG. 5A and FIG. 5B.

FIG. 5A is a plan view illustrating a flow of the lubricant when the rack bar is moved to the right of the page, FIG. 5B is a plan view illustrating a flow of the lubricant when the rack bar is moved to the left of the page, and FIG. 6 is a side view of the rack guide as seen from the VI direction in FIG. 5A and FIG. 5B.

In the rack and pinion steering device SD as described above, the lubricant G is applied to the rack bar SD3, so that when the rack bar SD3 slides against the rack guide 100, the lubricant G is interposed between the rack bar SD3 and the rack guide 100 as illustrated in FIG. 5A to FIG. 6.

<3.1. Lubricant Flow Around the Lubricant Introducing Area>

First, a flow of the lubricant G around the lubricant introducing area 122*a* of the lubricant retaining groove 122 will be described with reference to FIG. 5A and FIG. 5B.

On the supporting surface 120A of the seat 120, the lubricant G adhering to the rack bar SD3 flows in the sliding direction of the rack bar SD3 as indicated by grey arrows in FIG. 5A and FIG. 5B.

Then, in accordance with movement of the lubricant G on the rack bar SD3 side, the lubricant G adhering to the seat 120 side on the spaced facing area 120A2*o* on the outer side also flows in the seat longitudinal direction as indicated by white arrows and flows from the lubricant introducing area 122*a* of the lubricant retaining groove 122 into the lubricant retaining groove 122.

In this case, the lubricant introducing area 122*a* of the lubricant retaining groove 122 is ship-bow-shaped, so that the lubricant G that has flowed into the lubricant retaining groove 122 flows toward the seat longitudinal center axis LA.

<3.2. Lubricant Flow in the Lubricant Retaining Area>

Next, a flow of the lubricant G in the lubricant retaining area 122*b* of the lubricant retaining groove 122 will be described with reference to FIG. 5A and FIG. 5B.

From the lubricant G retained in the lubricant retaining area 122*b*, a portion of the lubricant G located in the contact area 120A1 of the supporting surface 120A adheres to the sliding surface SD3*a* of the rack bar SD3.

From the lubricant G retained in the lubricant holding area 122*b*, in accordance with movement of the rack bar SD3, a portion of the lubricant G located in the spaced facing area 120A2*i* on the inner side in the supporting surface 120A flows out from the lubricant holding groove 122 in the sliding direction of the rack bar SD3 and toward the seat longitudinal center axis LA.

Thus, in this embodiment, the lubricant G between the rack bar SD3 and the supporting surface 120A gathers toward the seat longitudinal center axis LA.

<3.3. Lubricant Flow Around an End Portion of the Supporting Surface on the Rack Bar Sliding Direction Side>

Next, a flow of the lubricant G around an end portion of the supporting surface 120A on the rack bar sliding direction side will be described with reference to FIG. 5A to FIG. 6.

As described above, the lubricant G is abundant in the spaced facing area 120A2*i* on the inner side in the supporting surface 120A, so that in accordance with sliding of the rack bar SD3, the lubricant G flows toward the facing surface 111*a*.

Then, as illustrated in FIG. 6, the lubricant G fills between the rack bar SD3 and the facing surface 111*a* and flows toward the spaced facing area 120A2o on the outer side of the supporting surface 120A as indicated by black arrows.

When the lubricant G flows between the rack bar SD3 and the facing surface 111a to the spaced facing area 120A2o on the outer side of the supporting surface 120A, the lubricant G adheres to the rack bar SD3 in the spaced facing area 120A2o on the outer side.

Then, again, as described in the above <3.1. >, the lubricant adhering to the rack bar SD3 flows into the supporting surface 120A and is introduced into the lubricant introducing area 122a of the lubricant retaining groove 122.

<3.4. Lubricant Flow Around an End Portion of the Supporting Surface on a Side Opposite to the Rack Bar Sliding Direction Side>

Next, a flow of the lubricant G around an end portion of the supporting surface 120A on a side opposite to the rack bar sliding direction side will be described with reference to FIG. 5A and FIG. 5B.

When the lubricant G adhering to the rack bar SD3 reaches an upper portion of the supporting surface 120A, the lubricant G located in the contact area 120A1 of the supporting surface 120A has difficulty in flowing between the rack bar SD3 and the supporting surface 120A, so that, as illustrated in FIG. 5A and FIG. 5B, most of the lubricant G flows toward the spaced facing area 120A2o on the outer side or the spaced facing area 120A2i on the inner side and flows from the spaced facing area 120A2o on the outer side or the spaced facing area 120A2i on the inner side into between the rack bar SD3 and the supporting surface 120A.

4. Effects

According to the rack guide 100 according to the present embodiment as described above, the lubricant retaining groove 122 is arranged in the supporting surface 120A, the lubricant retaining groove 120 being configured to extend in the seat transverse direction (rack guide transverse direction) perpendicular to the seat longitudinal direction (rack guide longitudinal direction) and retain the lubricant G located between the rack bar SD3 and the supporting surface 120A, the lubricant retaining groove 122 has the ship-bow-shaped lubricant introducing area 122a into which the lubricant G is introduced and the lubricant retaining area 122b connected to the lubricant introducing area 122a and configured to retain the lubricant G introduced from the lubricant introducing area 122a, the lubricant retaining area 122b of the lubricant retaining groove 122 is provided in the contact area 120A1 of the supporting surface 120A, and the lubricant introducing area 122a of the lubricant retaining groove 122 is provided in the spaced facing area 120A2o on the outer side in the supporting surface 120A, whereby, while the rack bar SD3 slides in the bar longitudinal direction, even when the lubricant G retained in the lubricant retaining area 122b of the lubricant retaining groove 122 is dragged by the lubricant G adhering to the rack bar SD3 so as to flow out from the lubricant retaining groove 122 to the exterior of the lubricant retaining groove 122, in accordance with such outflow of the lubricant G from the lubricant retaining area 122b of the lubricant retaining groove 122, the lubricant G located in the lubricant introducing area 122a is fed to the lubricant retaining area 122b, so that into the lubricant introducing area 122a with the lubricant G thus decreased, the lubricant G flows in accordance with sliding of the rack bar SD3, which can achieve a stable feed of the lubricant G to the lubricant retaining groove 122 by means of the rack bar SD3.

Consequently, the lubricant G adhering to the sliding surface SD3a of the rack bar SD3 is evenly used, which can extend the timing of exchange of the lubricant G.

Further, the lubricant introducing area 122a of the lubricant retaining groove 122 is formed to be symmetrical with respect to the groove longitudinal center axis A parallel to the seat transverse direction, so that an inflow amount of the lubricant G into the lubricant introducing area 122a does not depend upon a rack bar sliding direction perpendicular to the seat transverse direction, and accordingly, a total amount of the lubricant G in the supporting surface 120A does not depend upon the number or the position of the lubricant retaining grooves 122, which can increase degrees of freedom of arrangement of the lubricant retaining grooves 122 in the supporting surface 120A.

Further, the lubricant retaining area 122b is perpendicular to the contact area 120A1 of the supporting surface 120A, the contact area 120A1 extending in the seat longitudinal direction, which makes it easier for the lubricant G retained in the lubricant retaining area 122b to adhere to the rack bar SD3 rather than flowing in the seat transverse direction when the rack bar SD3 slides in the longitudinal direction, so that when the rack bar SD3 slides against the rack guide 100, the lubricant G can be stably supplied from the lubricant retaining groove 122 to the rack bar SD3, which can achieve both a stable feed of the lubricant G from the rack bar SD3 to the lubricant retaining groove 122 and a stable supply of the lubricant G from the lubricant retaining groove 122 to the rack bar SD3 when the rack bar SD3 slides against the rack guide 100.

Moreover, the lubricant retaining area 122b extends to the spaced facing area 120A2i on the inner side in the supporting surface 120A, whereby the lubricant G introduced from the lubricant introducing area 122a into the lubricant retaining groove 122 spreads to the spaced facing area 120A2i on the inner side in the supporting surface 120A, and then the lubricant G spreading to the spaced facing area 120A2i on the inner side in the supporting surface 120A is circulated by sliding of the rack bar SD3 to the spaced facing area 120A2o on the outer side in the supporting surface 120A, so that in comparison with a case in which the lubricant retaining area does not extend to the spaced facing area on the inner side in the supporting surface, an larger amount of the lubricant G contributing to sliding of the rack bar SD3 can be retained and thus the lifetime of the rack guide 100 can be extended.

In addition, a facing surface 111a configured to face the sliding surface SD3a of the rack bar SD3 is arranged more outward than the supporting surface 120A and at a position farther away from the rack bar SD3 than the supporting surface 120A, whereby, even when the rack bar SD3 slides against the rack guide 100 and the lubricant G interposed between the rack bar SD3 and the supporting surface 120A overflows from between the rack bar SD3 and the supporting surface 120A, then the lubricant G accumulates between the sliding surface SD3a of the rack bar SD3 and the facing surface 111a, so that the lubricant G can be not only easily stored on the rack guide 100, but also the lubricant G accumulating between the sliding surface SD3a of the rack bar SD3 and the facing surface 111a adheres to the rack bar SD3 so as to be fed to the lubricant retaining groove 122, which can circulate the lubricant G between the entirety of the supporting surface 120A of the rack guide 100 and the rack bar SD3.

Variants

The rack guide according to an embodiment of the present invention has been described above, but the rack guide according to the present invention is not limited to the rack guide according to the above embodiment.

For example, in the above embodiment, the rack guide body 110 is made of a metal, but the material of the rack guide body is not limited to a metal, and the rack guide body may be made of, for example, a resin.

For example, in the above embodiment, the seat 120 has a uniform thickness, but the seat thickness may be non-uniform.

For example, in the above embodiment, the number of lubricant retaining grooves 122 in the seat 120 is 14, but the number of lubricant retaining grooves arranged in the seat is not limited to 14.

For example, in the above embodiment, the rack guide 100 is made from two members, i.e., the rack guide body 110 and the seat 120, but the rack guide body and the seat may be integrally formed.

Figure 7A:
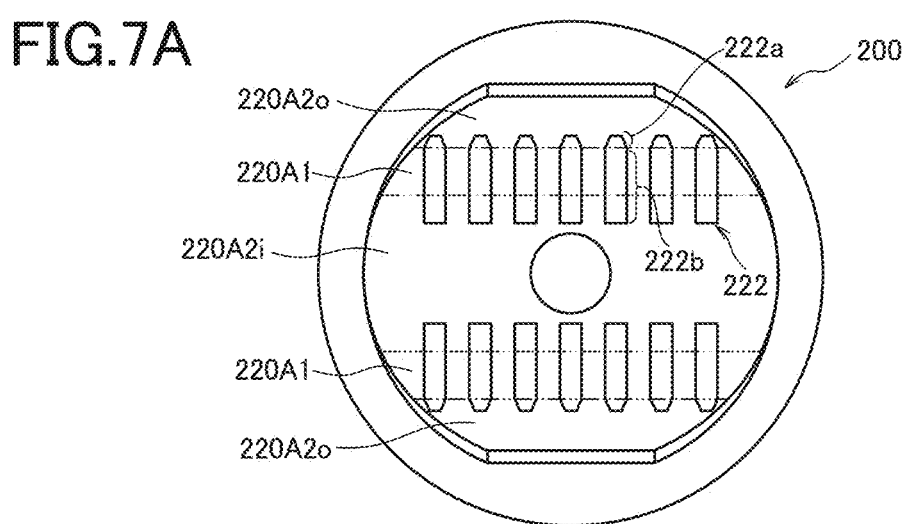
FIG. 7A is a plan view of a rack guide according to a first variant of the present invention.
Figure 7B:
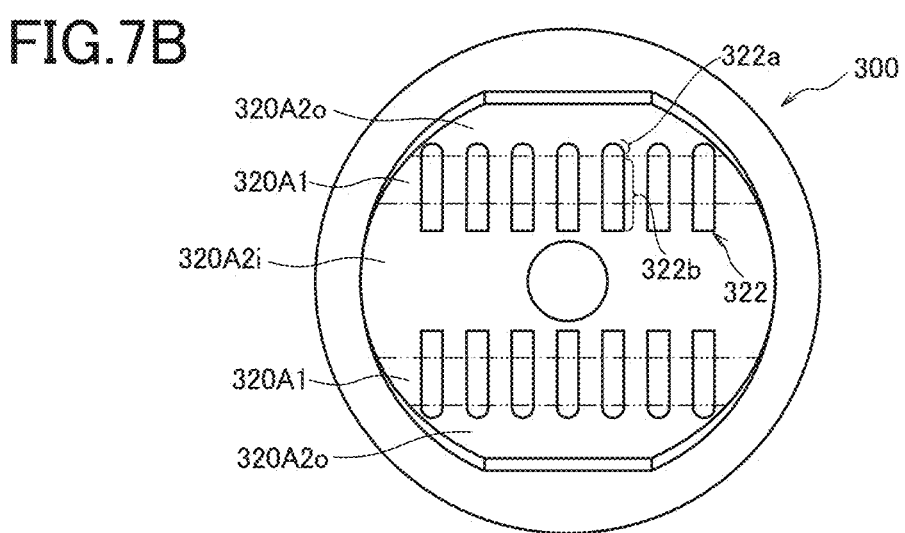
FIG. 7B is a plan view of a rack guide according to a second variant of the present invention.
Figure 7C:
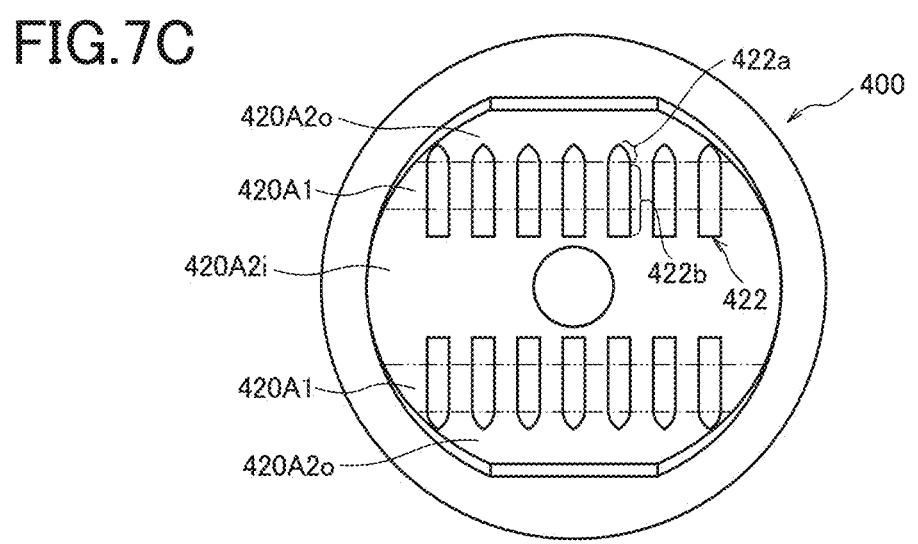
FIG. 7C is a plan view of a rack guide according to a third variant of the present invention.

For example, in the above embodiment, the lubricant retaining groove 122 formed in the seat 120 is formed by the ship-bow-shaped lubricant introducing area 122a and the lubricant retaining area 122b connected to this lubricant introducing area 122a as illustrated in FIG. 4, but the shape of the lubricant introducing area of the lubricant retaining groove is not limited to the above embodiment as long as the shape of the lubricant introducing area is formed to be symmetrical with respect to the groove longitudinal center axis and inclined with respect to this groove longitudinal center axis, and the shape of the lubricant introducing area may be, for example, those as illustrated in FIG. 7A to FIG. 7C.

In other words, similarly to a rack guide 200 as illustrated in FIG. 7A which is a plan view of a rack guide according to a first variant of the present invention, a lubricant retaining groove 222a may be formed to have a trapezoidal shape, similarly to a rack guide 300 as illustrated in FIG. 7B which is a plan view of a rack guide according to a second variant of the present invention, a lubricant retaining groove 322a may be formed to have a semicircular shape or similarly to a rack guide 400 as illustrated in FIG. 7C which is a plan view of a rack guide according to a third variant of the present invention, a lubricant retaining groove 422a may be formed by two arcs combined together.

That is to say, the "bow-like" shape is not limited to the shapes in the above embodiment (for example, FIG. 4), but includes shapes, such as a trapezoidal shape (FIG. 7A), a semicircular shape (FIG. 7B), and a shape in which two arcs are combined together (FIG. 7C).

Further, in the above embodiment, the side of the lubricant retaining area of the lubricant retaining groove closer to the seat longitudinal center axis is a straight line approximately parallel to the rack guide longitudinal direction, whereas the side of the lubricant retaining area of the lubricant retaining groove closer to the seat longitudinal center axis may be not approximately parallel to the rack guide longitudinal direction and may be not a straight line.

For example, in the above embodiment, the lubricant retaining groove 122 is formed to be symmetrical with respect to the groove longitudinal center axis, but as long as the lubricant introducing area of the lubricant retaining groove is formed to be symmetrical with respect to the groove longitudinal center axis, the lubricant retaining area may be formed to be not symmetrical with respect to the groove longitudinal center axis.

REFERENCE SIGNS LIST

100, 200, 300, 400 rack guide
110 rack guide body

111 seat placement groove
111a facing surface
111a1 seat engagement hole
120 seat
120A supporting surface
120A1 contact area
120A2 spaced facing area
120A2i spaced facing area on inner side
120Ao spaced facing area on outer side
121 convex portion
122, 222, 322, 422 lubricant retaining groove
122a lubricant introducing area
122b lubricant retaining area
SD rack and pinion steering device
SD1 device housing
SD2 steering shaft
SD2a pinion
SD3 rack bar
SD3a sliding surface
SD3b meshing surface (rack teeth)
SD4 biasing spring
GA rack guide center axis
LA seat longitudinal center axis (rack guide longitudinal center axis)
WA seat transverse center axis (rack guide transverse center axis)
A groove longitudinal center axis
Rb radius of curvature of rack bar
Rs radius of curvature of seat
Os1 center of curvature of seat
Os2 center of curvature of seat
Ob center of curvature of rack bar
G lubricant

The invention claimed is:

1. A rack guide for a steering device, comprising a supporting surface for supporting a sliding surface provided behind a meshing surface formed on a rack bar having a D-shaped cross section, the rack bar being configured to mesh with a pinion formed on a steering shaft to convert a rotational motion of the steering shaft into a linear motion, the rack guide being configured to guide the rack bar in a bar longitudinal direction of the rack bar to change a steering angle of a tire, wherein:

the sliding surface of the rack bar is a curved surface formed to have a single radius of curvature, the supporting surface is a curved surface having a contact area configured to come into slidable contact with the rack bar and a plurality of spaced facing areas configured to face the rack bar with a space therebetween, the plurality of spaced facing areas comprising:

a first spaced facing area disposed on an inner side closer to a rack guide longitudinal center axis configured to extend in a rack guide longitudinal direction parallel to a sliding direction of the rack bar, and a second spaced facing area disposed on an outer side farther from the rack guide longitudinal center axis, the contact area is located between the first spaced facing area and the second spaced facing area, a lubricant retaining groove is arranged in the supporting surface, the lubricant retaining groove being configured to extend in a rack guide transverse direction perpendicular to the rack guide longitudinal direction and retain a lubricant located between the rack bar and the supporting surface, the lubricant retaining groove has a lubricant introducing area into which the lubricant is introduced and a lubricant retaining area connected to the lubricant introducing area and configured to retain the lubricant introduced from the lubricant introducing area, the lubricant retaining area of the lubricant retaining groove is provided in the contact area of the supporting surface, and the lubricant introducing area of the lubricant retaining groove is provided in the second spaced facing area on the outer side in the supporting surface and is formed to be symmetrical with respect to a groove longitudinal center axis parallel to the rack guide transverse direction.

2. The rack guide according to claim 1, wherein the lubricant retaining area is perpendicular to the contact area of the supporting surface, the contact area extending in the rack guide longitudinal direction.

3. The rack guide according to claim 1, wherein the lubricant retaining area extends to the first spaced facing area on the inner side in the supporting surface.

4. The rack guide according to claim 1, wherein a facing surface configured to face the sliding surface of the rack bar is arranged more outward than the supporting surface and at a position farther away from the rack bar than the supporting surface.

5. The rack guide according to claim 2, wherein the lubricant retaining area extends to the first spaced facing area on the inner side in the supporting surface.

6. The rack guide according to claim 2, wherein a facing surface configured to face the sliding surface of the rack bar is arranged more outward than the supporting surface and at a position farther away from the rack bar than the supporting surface.

7. The rack guide according to claim 1, wherein the lubricant introducing area has a triangular shape, a trapezoidal shape, a semicircular shape, or a shape in which two arcs are combined together.

* * * * *